United States Patent [19]

Fujiyoshi et al.

[11] 4,107,148
[45] Aug. 15, 1978

[54] POWDER COATING COMPOSITION COMPRISING A MIXTURE OF A POLYESTER AND PLURAL SILICONE COMPOUNDS

[75] Inventors: Kanji Fujiyoshi; Minoru Fukuda; Yutaka Mizumura; Junji Sono; Iori Naito, all of Otsu, Japan

[73] Assignee: Toyo Boseki Kabushiki Kaisha, Osaka, Japan

[21] Appl. No.: 606,022

[22] Filed: Aug. 20, 1975

[30] Foreign Application Priority Data

Aug. 22, 1974 [JP] Japan .................................. 49-96851
Jun. 20, 1975 [JP] Japan .................................. 50-76049

[51] Int. Cl.$^2$ ...................... C08G 18/42; C08G 18/61
[52] U.S. Cl. ..................................... 528/273; 260/825
[58] Field of Search .................. 260/824, 75 NP, 825; 427/195

[56] References Cited

U.S. PATENT DOCUMENTS

| 3,243,475 | 3/1966 | Reischl et al. ................... 260/824 R |
| 3,822,240 | 7/1974 | Schmitt et al. ................ 260/77.5 TB |
| 3,850,880 | 11/1974 | Hakonson et al. ............. 260/75 NE |
| 3,909,475 | 9/1975 | Schneider ...................... 260/29.1 SB |
| 3,932,337 | 1/1976 | Shah .............................. 260/29.1 SB |
| 3,954,901 | 5/1976 | Watanabe et al. ............... 427/195 X |

Primary Examiner—Sandra M. Person
Attorney, Agent, or Firm—Birch, Stewart, Kolasch and Birch

[57] ABSTRACT

A hydroxyl terminated copolyester which is basically constituted with ethylene glycol and terephthalic acid is formulated into a heat curable powder coating composition by mixing with specific plural silicone compounds. The resultant paint film is excellent in flatness and free from leveling faults and has superior properties.

23 Claims, No Drawings

POWDER COATING COMPOSITION COMPRISING A MIXTURE OF A POLYESTER AND PLURAL SILICONE COMPOUNDS

This invention relates to a heat curable polyester based resinous composition, which is suitable for powder coating.

Further, this invention relates to a pulverulent film-forming material which is capable of forming a cured paint film having superior properties.

It is known that there are two types of powder coatings with respect to behavior on heating which is followed by powder attraction onto a substrate. One is the thermoplastic type which is featured in that powder on a substrate only melts and forms a paint film, where the polymer contained in the powder does not cure or thermoset to form a cross-linked constitution. Another is the thermosetting or heat-cure type which is featured in that the polymer contained in the powder does cure or thermoset to form a crosslinked constitution during heating. The latter type generally gives better mechanical film properties, such as, surface hardness, solvent resistance, than the former, but has the disadvantage of yielding many leveling faults on the film surface, i.e. the so-called craters, pinholes and wrinkles.

In the field of heat curable polyester based powder coatings, it was expected that a copolyester which is basically constituted with ethylene glycol and terephthalic acid, more particularly, a copolyester in which the terephthalic acid residue shares at least 50% mole in total combined acidic components and the ethylene glycol residue shares at least 50% mole in total combined alcoholic components in the copolyester, may give a heat cured film having superior properties, particularly, in mar resistance as well as in corrosion resistance, because of the copolyester's potentiality as a shape forming material. However, the copolyester has not heretofore been actually formulated into a heat curable powder coating composition to give fully decorative finishing effects.

It is a principal object of this invention to provide the above mentioned copolyester containing composition which is capable of forming a heat cured paint film having superior properties. Other objects of this invention will be evident from the following description of this invention.

Briefly stated, this invention accomplishes the above cited objects by formulating a resinous composition which comprises a mixture of ethylene glycol-terephthalic acid based copolyester having hydroxyl terminals (hereafter referred to as "the copolyester [I]"), a coreactant for curing therewith and specifically chosen plural kinds of silicone compounds, which will be described later as silicone compounds [II] being composed of plural members selected from both the group [IIA] and the group [IIB].

The copolyester [I] indicates, as aforesaid, a copolyester in which the terephthalic acid residue shares at least 50% mole in total acidic components and the ethylene glycol residue shares at least 50% mole in total alcoholic components in the polymer.

Accordingly, the copolyester [I] may be prepared from terephthalic acid, ethylene glycol and at least one other acidic or alcoholic compound. Choice of a particular compound in both components is quite optional. Listed in the following are compounds suitable to prepare the copolyester [I] besides the two basic ones.

(a) acidic component isophthalic acid, orthophthalic acid, adipic acid, azelaic acid, sebacic acid, dodecanedicarboxylic acid, citric acid, 1,4-cyclohexane dicarboxylic acid, trimellitic acid anhydride, pyromellitic acid dianhydride, p-oxy benzene carboxylic acid, fumaric acid, maleic acid anhydride, oxyethoxy benzoic acid methyl ester.

(b) alcoholic component propylene glycol, 1,4-butane diol, diethylene glycol, neopentyl glycol, hexamethylene glycol, 2,2-bis[4-(2-hydroxyethoxy)phenyl] propane, cyclohexane dimethanol, glycerol, trimethylol propane, pentaerithyritol.

When a tri- or tetra-valent compound, such as, glycerol, trimethylol propane, trimellitic acid anhydride, pyromellitic acid dianhydride, is employed, the resultant copolyester [I] has a branched configuration, which is preferable in this invention. Preparation of the copolyester [I] is feasible in a known manner, i.e., an esterification reaction, or ester exchange reaction followed by a polycondensation reaction under vacuum in the presence of a customary catalyst.

For the purpose of providing the copolyester [I] with more hydroxyl terminals, the alcoholic (b)/acidic (a) molar ratio at the start of preparation may preferably be more than 1.1, in other words, the alcoholic component may as well be significantly in excess. The resultant copolyester [I] preferably has a molecular weight (MW) in the range of 1000 to 7000, secondary transition temperature (Tg) in the range of 30° to 80° C measured by the differential scanning calorimetric (DSC) method and has a smaller amount of terminals other than the hydroxyl terminal.

We believe those who are skilled in the art are able to manage the choice of suitable compounds, reaction conditions as well as other necessary techniques so that the copolyester [I] falls into its preferable requirement ranges as aforesaid.

The use of a coreactant to cure with the copolyester [I] is necessary for formulating a heat curable composition, but choice of a specific compound as a coreactant is optional. There are various compounds which are useable in this invention; suitable are an alkoxylated polyamine-aldehyde resin, a polyanhydride, and a blocked or masked polyisocyanate, which are briefly referred to in the following;

(a) Alkoxylated polyamino-aldehyde resin: this is in general an aminoplast condensate, which is the alkoxylated condensation product of an aldehyde (e.g. formaldehyde) with a polyamine compound, (e.g. melamine, benzoguanamine). Preferred are those, such as, hexamethoxymethyl melamine, partially (e.g. penta-, tetra-) methoxymethylated methylol melamine, two molar condensate of partially methoxymethylated methylol melamine, methyl-ethyl mixed etherate of tetramethylol benzoguanamine, (b) Polyanhydride is a compound having at least two anhydride groups in the molecule. Preferred ones are compounds, such as, pyromellitic acid dianhydride,
2,3,6,7-naphthalene tetracarboxylic acid dianhydride, ethylene bis(trimellitate) dianhydride, glycerin tris(trimellitate) trianhydride, bisphenol A bis(trimellitate) dianhydride, benzophenone tetracarboxylic acid dianhydride.

(c) Blocked polyisocyanate is a polyisocyanate based compound which liberates a blocking agent to yield a free isocyanate group (—NCO) when heated. Preferred polyisocyanates are those, such as: trimethylene diisocyanate, tetramethylene diisocyanate, hexamethylene diisocyanate, toluene diisocyanate, toluene triisocyanate, xylylene diisocyante, diphenylmethane diisocyanate, dimethyl cyclohexane ω ω' diisocyanate (H6XD1), isophorone diisocyanate, phenylene diisocyanate, 4,4' methylene bis(cyclohexyl isocyanate), Adducts of these isocyanates with various polyamines (e.g. ethylene diamine, propylene diamine) or polyols (e.g. ethylene glycol, glycerin, trimethylol propane) are also useable to prepare a blocked polyisocyanate.

Blocking agents are, in general, active hydrogen-containing compounds. Preferred are phenol, alkylated phenols, methyl ethyl ketoxime, cyclohexanone ketoxime, ε-caprolactam, δ-valerolactam, aliphatic mercaptans, aliphatic alcohols, and hydroxy benzophenone alkyl derivatives.

Preparation of blocked polyisocyanates is illustrated in issue patent specifications, such as, U.S. Pat. No. 3,583,943, U.S. Pat. No. 3,705,119, and U.S. Pat. No. 3,787,469.

We believe that a properly catalyzed blocked polyisocyanate is the most suitable as a coreactant for the copolyester [I], in the light of improvement in properties of the finished or cured paint film. The amount of a coreactant in relation to the copolyester [I] is dependent upon how much the copolyester [I] possesses hydroxyl terminals or hydroxyl value. When the copolyester's primary properties are in the above mentioned range, a suitable amount of coreactant to be employed may generally be determined in the following range on the basis of 100 parts of the copolyester [I]:

(a) alkoxylated polyamine-aldehyde resin — 2 - 10 parts
(b) polyanhydride — 3 - 15 parts
(c) blocked polyisocyanate — 10 - 70 parts When the copolyester [I] is an unsaturated one, an organic peroxide is advantageously employed in addition to the above coreactant in order to activate unsaturated bonds involved in the copolyester [I].

Preferred are organic peroxides, whose half value decomposition period is more than 10 hours at 110° C, such as, dicumyl peroxide, di-tertiary butyl peroxide, tertiary butyl cumyl peroxide, cumene hydro peroxide, para-menthane hydroperoxide. Referring now to silicone compounds [II], which consist of plural members selected from two groups of [IIA] and [IIB], the general formula of [IIA] is given as follows;

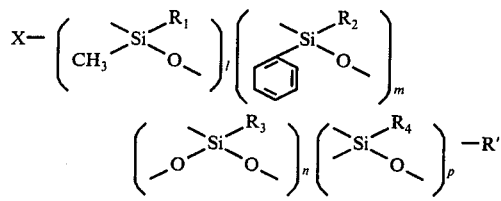

[IIA]

wherein, $R_1$, $R_2$, $R_3$, $R_4$ are methyl or phenyl radicals.

R' is a hydrogen atom or methyl radical and links with the oxygen atom.

X is methoxy or a hydroxyl radical and links directly with the Si atom.

$l$, $m$, $n$, $p$ are zero or positive integers, but they must not be zero all at once.

The mark —O— attached to the Si atom combines or links with any Si atom in the four (parenthesis) kinds of organosiloxane units, otherwise, terminates with a hydrogen atom or methyl radical, that is consequently equivalent termination with R' in the above. The mark — attached to the Si atom combines or links with an oxygen atom to form a siloxane bond.

Accordingly, the group [IIA] covers polyorganosiloxane compounds which consist of random and appropriate combinations of the above four organosiloxane units at most.

In addition to the above, there are a few preferred requirements for compounds of [IIA].

1. The radical unit based relative ratio of methyl (—CH₃) and phenyl () radicals being directly combined with the Si atom or "methyl ratio"

$\{(-CH_3)/(-CH_3) + (\text{phenyl})\}$, is preferably between 0.10 and 0.75.
2. Preferred molecular weight (MW) range is between 400 and 5000.

Remarks In the formula [IIA],
(i) when l, and/or m are proper positive integer(s), and n, p are zero, a linear is obtained.
(ii) when l and/or m, n are proper positive integers and p is zero, a branched configuration is obtained.
(iii) when n, p are proper positive integers, a cyclic configuration is obtained.

Branched and cyclic compounds having the preferred methyl ratio as well as MW are more suitable for this invention.

We believe that correspondence of a polymer configuration toward assuming the suffix letters ($l$, $m$, $n$, $p$) is easily understood by those skilled in the art, though, a few embodiments in the case of branched (ii) and cyclic (iii) configurations are illustrated in the following including the formula to be employed in this specification and another comparative formula, where the comparative one will be proved inconveniently spacious. The book "Metalorganic polymers", volume 8 in the series of Polymer Reviews, by K. A. Andrianov et al published by Interscience Publishers (1965) covers preparation of polyorganosiloxanes having various configurations, where we believe the comparative formula is mostly employed.

The book "Silicones" in the Reinhold Plastic Application Series, by R. N. Meals et al, published by Reinhold Publishing Corp. (1962) uses abbreviations of M, D, T, Q to denote organosiloxane units having different functions. We believe that the parenthesized units to be employed herein are analogous to the above abbreviated units.

Note A dotted line . . . used to divide a comparative formula in the following corresponds to (parenthesis) in the formula to be employed herein.

| | suffix assumption in formula [IIA] | formula to be employed herein | another comparative formula |
|---|---|---|---|
| Example A (Cyclic) | l=0, m=n=1 p=1 | | |
| Example B (Cyclic) | l=0, m=2 n=2, p=1 | | |
| Example C (Cyclic) | l=2, m=0 n=3, p=1 | | |
| Example D (Branched) | l=3, m=0 n=1, p=0 | | |

| | suffix assumption in formula [IIA] | formula to be employed herein | another comparative formula |
|---|---|---|---|
| Example E (An illustration appearing on page 61 in the aforesaid "Metalorganic polymers" by Andrianov) | $\left[\begin{array}{c}-O_{\frac{1}{2}}-\\R-Si-O_{\frac{1}{2}}-\\-O_{\frac{1}{2}}-\end{array}\right]_x$ | $\left[-ORSi\underset{O}{\overset{O}{\diagdown}}\underset{SiRO}{\overset{SiRO}{\diagup}}\right]_x$ | |

δ Remark ends

Several specific embodiments are illustrated as follows:

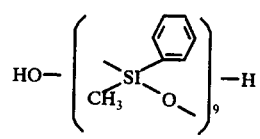
[IIA-1]

[IIA-1] corresponds to an embodiment where $l=9$, $m=n=p=0$, $R_1$=phenyl, $R'$=hydrogen, X=hydroxyl in the general formula, methyl ratio=0.5, MW=1242

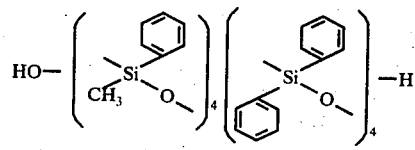
[IIA-2]

$l=m=4$, $n=p=0$, $R_1=R_2$=phenyl, $R'$=hydrogen, X=hydroxyl, methyl ratio=0.25, MW=1354

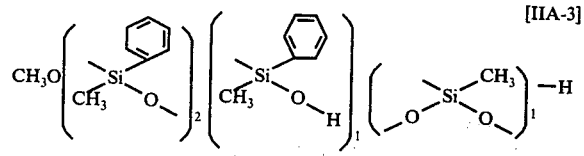
[IIA-3]

$l=3$, $n=1$, $m=p=0$, $R_1$=phenyl, $R_3$=methyl, $R'$=hydrogen, x=methoxy, methyl ratio=0.57, MW=530

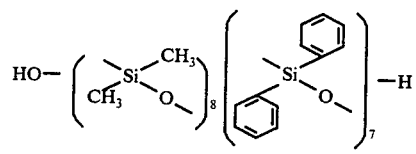
[IIA-4]

$l=8$, $m=7$, $n=p=0$, $R_1$=methyl, $R_2$=phenyl, $R'$=hydrogen, x=hydroxyl, methyl ratio=0.53, MW=1996

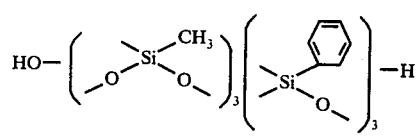
[IIA-5]

$l=m=0$, $n=p=3$, $R_3$=methyl, $R_4$=phenyl, $R'$=hydrogen, X=hydroxyl, methyl ratio=0.50, MW=606

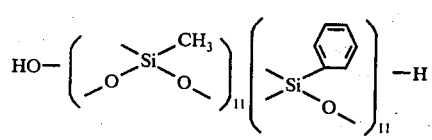
[IIA-6]

$l=m=0$, $n=p=11$, $R_3$=methyl, $R_4$=phenyl, $R'$=hydrogen, X=hydroxyl, methyl ratio=0.50, MW=2174

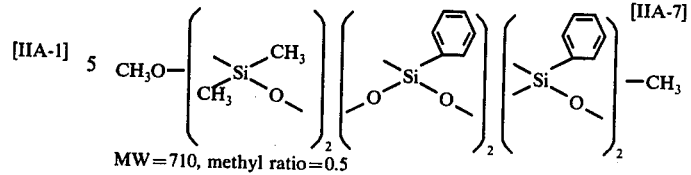
[IIA-7]

MW=710, methyl ratio=0.5

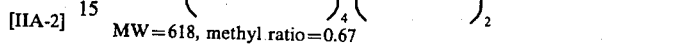
[IIA-8]

MW=618, methyl ratio=0.67

[IIA-9]

MW=742, methyl ratio=0.33

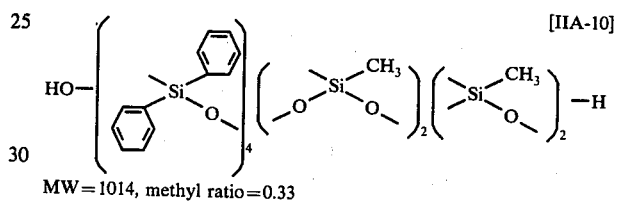
[IIA-10]

MW=1014, methyl ratio=0.33

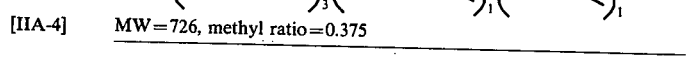
[IIA-11]

MW=726, methyl ratio=0.375

The general formula of the group [IIB] is given as follows:

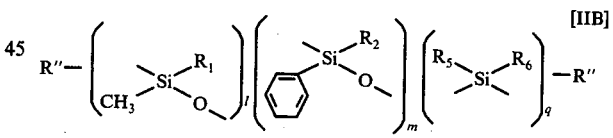
[IIB]

wherein, $R_1$, $R_2$, $R_5$, $R_6$ are methyl or phenyl radicals.

R" is methyl or another alkyl, such as, ethyl, propyl, butyl, phenyl, octyl radical.

$l$, $m$, $q$ are zero or positive integers, but they must not be zero all at once.

The mark — attached to the Si atom combines or links with the oxygen atom to form a siloxane bond. The mark —O— attached to the Si atom combines or links with any Si atom in the three kinds of organosiloxane units or terminates with the R" radical.

Accordingly, the group [IIB] covers polyorganosiloxane compounds which are random and appropriate combinations of the above three parenthesized units at most. These compounds always have a linear shape and have neither hydroxyl nor methoxy terminals. The methyl ratio thereof is preferably between 0.40 and 0.90, and further the MW thereof is also between 500 and 10000. A few specific embodiments are illustrated in the following:

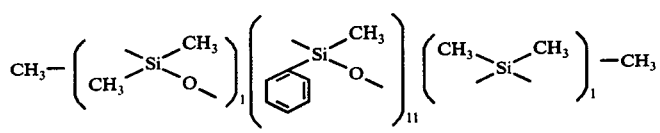

[IIB-1]

$l=1$, $m=11$, $q=1$, $R_1=R_2=R_5=R_6=R''=$methyl, methyl ratio$=0.61$, MW$=1658$

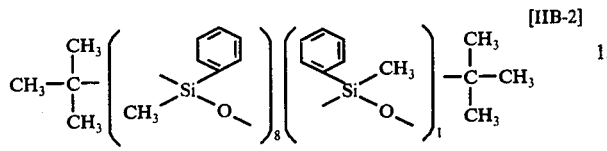

[IIB-2]

$l=8$, $m=0$, $q=1$, $R_1=R_5=$phenyl, $R_6=$methyl, $R''=$tertiary butyl, methyl ratio $=0.55$, MW$=1324$

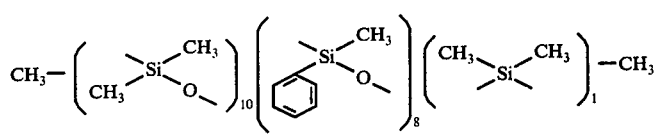

[IIB-3]

$l=10$, $m=8$, $q=1$, $R_1=R_2=R_5=R_6=R''=$methyl, methyl ratio$=0.80$ MW$=1916$

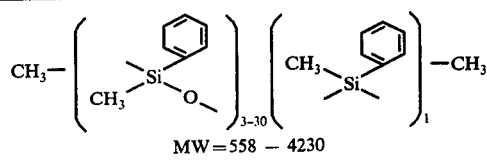

MW$=558-4230$

[IIB-4]

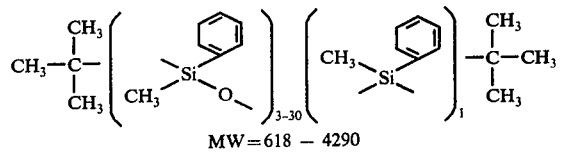

MW$=618-4290$

[IIB-5]

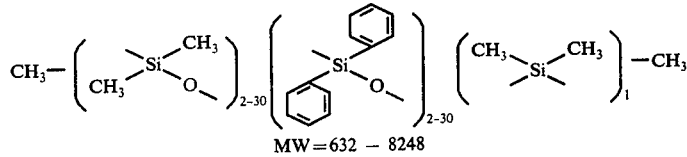

MW$=632-8248$

[IIB-6]

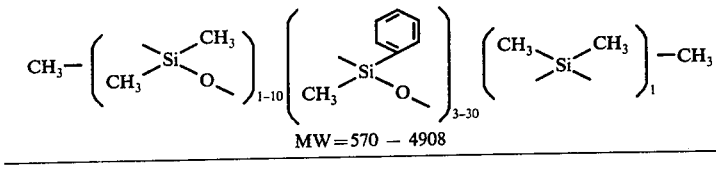

MW$=570-4908$

[IIB-7]

The amount of silicone compound [IIA] and [IIB] to be mixed with copolyester [I] is preferably from 0.1 to 5.0 parts based on 100 parts of copolyester [I], where the relative ratio of [IIA]/[IIB] on the weight basis is preferably between 0.1 and 10. Combination or cojoint use of plural silicone compounds [IIA] and [IIB] as above described is essentially important. If either is employed alone, the particular effects aimed at by this invention can not be attained, which will be clear through the description hereinafter.

Fundamental distinction between [IIA] and [IIB] exists in the point that a compound in [IIA] always possesses terminal hydroxyl or methoxy radicals, whereas the compounds in [IIB] do not have such terminals.

Some literature references teach that a hydroxyl as well as a methoxy terminal attached to a silicone compound is reactive. Several patent specifications, for instance, U.S. Pat. Nos. 3,044,979, 3,044,980, and 3,449,465 make use of the reactivity to prepare a condensate with a polyester, but in this invention we believe it improbable that silicone compound [IIA] reacts and forms a condensate with the copolyester [I], in view of the heat effect imposed during processing of the composition.

We believe, up to the state prior to heat curing followed by powder attraction onto a substrate, that the silicone compounds [II] and the copolyester [I] remain substantially as a physical mixture, which will also be evident through the description hereinafter.

The process of preparing a resinous composition is customary. The copolyester resin [I], the coreactant, the silicone compounds [II], pigments, and other necessary ingredients, such as a flow control agent, ultraviolet absorber, antioxidant, further if desired, other various aids, for instance, benzophenone or its derivatives, benzoin or its derivatives, alkylated phenols, are first mechanically blended by a high speed blade mixer to obtain a preliminarily homogenized composition, which is then melt blended to enhance homogeneity by a milling roller or a twin extruder with heat capacity. Melt-blending is controlled at the temperature range just beyond melt flow temperature of the resinous composition for a short resident time, so that any reaction among the ingredients may be avoided. The condition to be employed in melt blending is at a temperature range from 80° to 150° C for from 20 to 200 sec. It is believed that those skilled in the art are able to control the operation to attain sufficient mixing under limited conditions. The homogeneously mixed composition thus obtained is, as usual, pulverized into small powder having a fineness suitable for coating.

The powder or pulverulent coating material may then be sprayed onto a substrate or an article to be coated by electrostatic attraction.

The powder attracted on an article is then heat cured to convert it into a uniform paint film having a cross-linked constitution as explained above. Usually the curing conditions are at a temperature ranging from 150° C to 250° C for from 5 to 40 min.

The paint film, when properly prepared from the composition in this invention, has many superior properties such as good weather durability, good corrosion resistance, good scratch resistance and especially, no leveling faults and an excellent mar resistance.

The composition in this invention may be advantageously applied to finish metal made furniture, building parts for outdoor use, automobile bodies, electric home appliances and other various articles.

The copolyesters [I] used in the examples hereinafter are listed in the following Table A which indicates their composition and primary properties.

The charged mass was heated gradually with stirring. Methanol started evolving at 130° C while heating of the reactants was continued finally up to 220° C for 3 hrs. After methanol evolution terminated, (d) 5.8 parts of trimellitic acid anhydride was charged thereto and the reactants were heated up to 250° C in 1 hr. Thereafter, the vessel was connected with a vacuum source to reduce the pressure inside the vessel. The pressure was then reduced down to 20 mm mercury absolute for 30 min., while maintaining the temperature at 250° C, under which conditions polycondensation was carried out for 1 hr., as the final stage of preparation.

The recovered polymer was a slightly yellow, transparent amorphous resin and had an MW of 3000 and an MP of 80° C. This resin was denoted as the copolyester [I-4] as aforesaid. The molar based ratio among the compounds (a), (b), (c), (d) at charge was, as is clear with each weight, $(a)/(c)/(d)$ 62:35:3. The molar ratio of the total alcoholic/acidic components at charge $(b)/[(a)+(b)+(d)]$ was 2,2.

No. 2 In the same manner as in the foregoing example, (a) dimethyl terephthalate 776 parts, (e) dimethyl isophthalate 194 parts, (b) ethylene glycol 620 parts, (f) glycerol 92 parts and zinc acetate 0.44 parts were charged. The ester exchange reaction was carried out at a temperature range from 150° C to 220° C for 3 hrs.

Thereafter, while raising the temperature up to 250° C, the pressure was reduced gradually and the polycondensation was carried out at 250° C, 20 mm mercury absolute for 30 min. The obtained polymer, which is denoted as the copolyester [I-5], was an amorphous resin having an MW of 2800, MP of 83° C and Tg of 53° C.

The molar ratio among the compounds (a), (b), (e), (f), at charge was $(a)/(e)=80:20$ and $(b)/(f)=100:10$. The total alcoholic/acidic molar ratio $(b)+(f)/(a)+(e)$ was 2,2. Analysis of the polymer composition showed Table A

| Copolyester [I] | Polymer composition (mol. basis) | MW | MP | Tg | OH value | COOH value |
|---|---|---|---|---|---|---|
| [I - 1] | tere/citric/TMA=82:4:14 EG/NPG=65:35 | 2100 | 71° C | 35° C | 1510 | 30 |
| [I - 2] | tere/iso/TMA=62:35:3 EG/NPG=70:30 | 3000 | 72° C | 58° C | 650 | 15 |
| [I - 3] | tere/iso/TMA=70:20:10 EG=100 | 2600 | 68° C | 50° C | 1100 | 18 |
| [I - 4] | tere/benzoic/TMA=62:35:3 EG=100 | 3000 | 85° C | 55° C | 600 | 15 |
| [I - 5] | tere/iso=80:20 GL/EG=13:87 | 2800 | 83° C | 53° C | 1200 | 10 | wherein
tere ...terephthalic acid
citric ...citric acid
TMA ...trimellitic acid anhydride
benzoic ...p-oxyethoxy benzoic acid
EG ...ethylene glycol
NPG ...neopentyl glycol
GL ...glycerol
iso ...isophthalic acid
MW ...molecular weight, measured by vapor pressure osmometer
MP ...melting point, measured by light transmission through a fine glass tube
Tg ...glass transition temp., by DSC method.
OH value ...equivalent per $10^6$ gram polymer.
COOH value..equivalent per $10^6$ gram polymer.

The present invention is further illustrated by the following non-limitative examples.

Examples on preparing the copolyester [I]

No 1 Charged into a reaction vessel equipped with a stirrer, a thermometer and a reflux condenser for evolving methanol were (a) dimethyl terephthalate 120 parts, (c) p-oxyethoxy benzoic acid methyl ester 69 parts, (b) ethylene glycol 136 parts and zinc acetate 0.088 parts as a catalyst.

$(a)/(e)=80:20$ and $(b)/(f)=87:13$.

Examples on powder coating

Properties of paint film obtained by powder coatings hereinafter were measured by the following methods.

(1) Flatness; rated by counting leveling faults, such as pin holes and craters, on a coated panel having an area of 70 × 150 mm. The rating versus the number of faults found is as follows;

-continued

⊚... zero or 1
○ ... 2 to 5
Δ ... 6 to 10
X ... more than 10
(2) Gloss; shown with 60° light reflectance coefficient
(3) Scratch resistance; rated by the degree of trace left behind by nail scratching on paint film. The rating is indicated as ⊚, ○, Δ, X in the order from nil to a large amount.
(4) Surface hardness; based upon pencil test.
(5) Corrosion resistance; rated with the depth of creepage or penetration from a scored line after 200 hrs of salt spray test (ASTM B 117-64). The rating versus the degree of penetration is as follows,
⊚... nil
○ ... less than 1 mm
Δ ... less than 3 mm
X ... more than 3 mm
(6) Erichsen test; cupping test by an Erichsen tester. Numerals are based on the depth of cupping without fracture.

No. 1 Four powder coating compositions as listed in Table 1 were formulated using the copolyester [I-1] or [I-3] and other necessary ingredients. Procedures involved therein were as follows; ingredients were first mechanically blended together by a high speed blade mixer to form a preliminary homogenized composition, which was thereafter melt blended by a twin compounding extruder at 120° C for 60 sec. The melt blended composition after being cooled was pulverized by a hammer mill and powder having a size finer than 150 mesh was sieved and used for powder coating. The powder was electrostatically sprayed onto a cold rolled steel panel having an area of 70 × 150 mm. A powder attracted panel was heated to the cure state in an electric air-convection heater for 20 min at different temperatures ranging from 160° C to 220° C in order to obtain good results for each composition. Average coating thickness of the cured paint film was found to be 100 – 120 microns.

Table 1 shows the ingredients in four compositions and Table 2 shows the paint film properties resulting from each composition. Numerals in the Tables hereinafter are parts by weight unless otherwise indicated.

The compositions 3 and 4 with ξ mark are comparative ones, in other words, these two do not belong to the present invention.

Table 1

| Ingredients | Compositions | | | |
|---|---|---|---|---|
| | 1 | 2 | ξ3 | ξ4 |
| Copolyester [I-1] | 100 | — | — | — |
| Copolyester [I-3] | — | 100 | 100 | 100 |
| PMDA | 6 | — | — | — |
| IPDI-CL | — | 15 | 15 | 15 |
| TiO₂ (pigment) | 40 | 40 | 40 | 40 |
| benzoin | 0.5 | 0.5 | 0.5 | 0.5 |
| silicone compound [IIIA-1] | 0.5 | 0.5 | 0.8 | — |
| silicone compound [IIB-2] | 0.5 | 0.5 | — | 0.8 | wherein
PMDA ... pyromellitic acid dianhydride
IPDI-CL ... isophorone diisocyanate blocked with ε-caprolactam.

Table 2

| Paint film properties | Compositions | | | |
|---|---|---|---|---|
| | 1 | 2 | ξ3 | ξ4 |
| flatness | ⊚ | ⊚ | Δ | X |
| gloss | 100 | 100 | 85 | 80 |
| scratch resistance | ⊚ | ⊚ | X | Δ |
| surface hardness | 2H | 2H | F | F |
| Erichsen test | 7 | 7 | 2 | 2 |
| corrosion resistance | ⊚ | ○ | Δ | X |

No. 2 Four powder coating compositions including the copolyester [I-2] were prepared and used for coating in the same manner as in the foregoing example. Ingredients in the compositions and paint film properties resulting therefrom are shown in the following Table 3 and Table 4. The compositions 3 and 4 with ξ mark are comparative.

Table 3

| Ingredients | Compositions | | | |
|---|---|---|---|---|
| | 1 | 2 | ξ3 | ξ4 |
| Copolyester [I-2] | 100 | 100 | 100 | 100 |
| HMMM | 5 | — | — | — |
| PMDA | — | 8 | 8 | 8 |
| TiO₂ (pigment) | 40 | 40 | 40 | 40 |
| benzoin | 0.5 | 0.5 | 0.5 | 0.5 |
| silicone compound [IIA-2] | 0.5 | — | — | — |
| silicone compound [IIA-4] | — | 0.5 | 0.8 | — |
| silicone compound [IIB-1] | 0.5 | — | — | — |
| silicone compound [IIB-3] | — | 0.5 | — | 0.8 | wherein
HMMM ... hexamethoxymethyl melamine

Table 4

| Paint film properties | Compositions | | | |
|---|---|---|---|---|
| | 1 | 2 | ξ3 | ξ4 |
| flatness | ⊚ | ⊚ | X | X |
| gloss | 100 | 100 | 85 | 85 |
| scratch resistance | ○ | ⊚ | Δ | X |
| surface hardness | 3H | 2H | F | F |
| Erichsen test | 7 | 7 | 2 | 2 |
| corrosion resistance | ⊚ | ○ | Δ | Δ |

No. 3 Four powder coating compositions including the copolyester [I-4] were prepared and used for coating in the same manner as in the previous examples.

Table 5 shows ingredients in these four compositions and Table 6 shows the paint film properties resulting therefrom. The compositions 3 and 4 with ξ mark are comparative.

Table 5

| Ingredients | Compositions | | | |
|---|---|---|---|---|
| | 1 | 2 | ξ3 | ξ4 |
| copolyester [I-4] | 100 | 100 | 100 | 100 |
| HMMM | 7 | — | 7 | — |
| XD1-CL | — | 15 | — | 15 |
| TiO₂ (pigment) | 40 | 40 | 40 | 40 |
| benzoin | 0.5 | 0.5 | 0.5 | 0.5 |
| silicone compound [IIA-2] | 0.5 | — | 0.5 | — |
| silicone compound [IIA-3] | — | 0.5 | — | — |
| silicone compound [IIB-1] | 0.5 | — | — | 0.5 |
| silicone compound [IIB-2] | — | 0.5 | — | — |

Table 6

| Paint film properties | Compositions | | | |
|---|---|---|---|---|
| | 1 | 2 | ξ3 | ξ4 |
| flatness | ⊚ | ⊚ | X | X |
| gloss | 100 | 100 | 80 | 90 |
| scratch resistance | ⊚ | ○ | Δ | Δ |
| surface hardness | 3H | 2H | H | F |
| Erichsen test | 7 | 7 | 2 | 5 |
| corrosion resistance | ○ | ⊚ | Δ | Δ |

In the composition 2 in the above, the silicone compound [IIB-2] was replaced by a silicone compound having a methyl ratio of 0.25, MW of 1800 and still conforming to [IIB], and the paint film properties therefrom were as follows;

| flatness | ○ |
|---|---|
| gloss | 90 |
| scratch resistance | Δ |
| surface hardness | 2H |
| Erichsen test | 7 |
| corrosion resistance | ⊚ |

No. 4 Five powder coating compositions including the copolyester [I-4] or [I-5] were prepared and used for coating in the same manner as in the previous examples.

Table 7 shows ingredients in the five compositions and Table 8 shows the paint film properties resulting therefrom. The composition 5 with ξ mark is comparative.

Table 7

| Ingredients | Compositions | | | | |
|---|---|---|---|---|---|
| | 1 | 2 | 3 | 4 | ξ5 |
| copolyester [I-4] | 100 | 100 | — | — | — |
| copolyester [I-5] | — | — | 100 | 100 | 100 |
| PMDA | 8 | — | 8 | — | — |
| IPDI-CL | — | 15 | — | 15 | 15 |
| TiO₂ (pigment) | 40 | 40 | 40 | 40 | 40 |
| benzoin | 0.5 | 0.5 | 0.5 | 0.5 | 0.5 |
| silicone compound [IIA-5] | 0.7 | — | 0.5 | — | 0.5 |
| silicone compound [IIA-6] | — | 0.7 | — | 0.5 | — |
| silicone compound [IIB-1] | — | — | 0.7 | 0.7 | — |
| silicone compound [IIB-3] | 0.7 | 0.7 | — | — | — |

Table 8

| Paint film properties | Compositions | | | | |
|---|---|---|---|---|---|
| | 1 | 2 | 3 | 4 | ξ5 |
| flatness | ⊙ | ⊙ | ⊙ | ⊙ | ◎ |
| gloss | 95 | 95 | 95 | 97 | 80 |
| scratch resistance | ◎ | ◎ | ○ | ◎ | × |
| surface hardness | 2H | 2H | 3H | 3H | F |
| Erichsen test | 7 | 7 | 7 | 5 | 2 |
| corrosion resistance | ○ | ◎ | ○ | ⊙ | × |

Additional test results on the paint film prepared from the composition 4 are shown in the following:

| (i) | Acid resistance . . . no effect. |
| | dipping in 5% acetic acid solution for 48 hrs. |
| (ii) | Alkaline resistance . . . no effect. |
| | dipping in 5% caustic soda solution for 48 hrs. |
| (iii) | Solvent resistance . . . H. |
| | pencil hardness after dipping in xylene for 48 hrs. |
| (iv) | Mar resistance . . . completely erased. |
| | the degree of erasing a red or black pen mark by an organic solvent. |
| (v) | Humidity test . . . 100/100 pass. |
| | cross cut test after setting in a humidity cabinet under 50° C, 98RH%, for 500 hrs. |
| (vi) | Boiling water resistance . . . no effect. |
| | dipping in boiling water for 4 hrs. |

No. 5 This example relates to an embodiment, where polyisocyanate is converted to an adduct form. The adduct is, as aforesaid, a combination of two or more polyisocyanates with a polyol or polyamine while keeping free some of the isocyanate radicals (—NCO) contained therein. A number of adduct formations were studied and it was found that adduct forming or combining by one mole of polymethylene glycol HO(CH₂)OH wherein N=2–8 with substantially two moles of dimethyl cyclohexane-ω,ω'-diisocyanate gives the best suitability to the copolyester [I] in terms of, particularly, compatibility as well as melt flow property of the pulverized coating composition obtained therefrom.

The term "dimethyl cyclohexane-ω, ω'-diisocyanate (DMCD)" herein includes 1,2-dimethyl-, 1,3-diemthyl-, or 1,4 -dimethylcyclohexane-ωω'-diisocyanate.

Included in the polymethylene glycol HO(CH₂)ₙOH wherein n=2–8 are, for instance, ethylene glycol, and trimethylene-, tetramethylene-, hexamethylene-glycol.

The reaction scheme involved in preparing a blocked (polyisocyanate-adduct) from the above two compounds and an active hydrogen containing compound as a blocking agent is shown below:

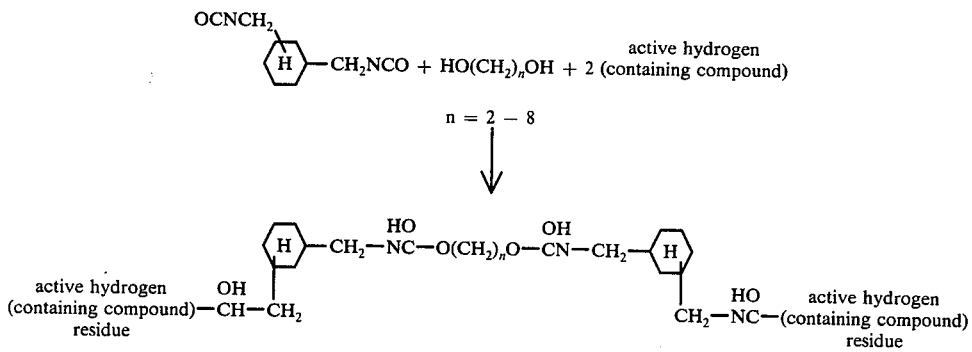

Shown in the following are a few examples of preparing a blocked (polyisocyanate-adduct).

No. 5-1 2 moles (382 g) of 1.3DMCD and 1 mole (62g) of ethylene glycol were charged into a reaction vessel equipped with a stirrer, a heater, a thermometer and a cooler. The charged reactants were heated with stirring up to 90° C and kept thereon for 1 hr. to make the reaction progress. Then, methyl ethyl ketoxime 2 moles (174 g) as a blocking agent was charged bit by bit and the reaction mass was kept at 120° – 130° C for 3 hrs. to complete the reaction involved. After cooling the vessel, a yellowish solid resin was recovered. The resin indicated an MW of about 610 and an MP of about 60° C and is denoted as "CO-5-1" hereinafter.

No.5-2 In the same manner as the above, 2 moles (384 g) of 1.3 DMCD and 1 mole (62 g) of ethylene glycol were reacted at 90° C for 1 hr. and 2 moles (226 g) of ε-caprolactam as a blocking agent were added therein and the reaction was carried out at 110° – 130° C for 3 hrs. The clear solid resin obtained therefrom indicated an MW of about 660 and an MP of 52° C, and is denoted as "CO-5-2" hereinafter.

No.5-3 In the same manner as above, 2 moles (384 g) of 1.3 DMCD and 1 mole (62 g) of ethylene glycol were reacted and 2 moles (226 g) of cyclohexanone oxime as a blocking agent together with 100 g of monochlorobenzene as a diluent was added thereto; the overall reactions were carried out under the same conditions as the above. The resin obtained was yellowish.

MW thereof was about 650 – 660 and MP thereof was 56° C and this resin is denoted as "CO-5-3" hereinafter.

No.5-4 This subexample relates to powder coating employing the above three blocked (polyisocyanate-adduct)s as coreactants to copolyester [I].

Four powder coating compositions were prepared and used for coating in the same manner as in the previous examples.

Table 9 shows ingredients in the four compositions and Table 10 shows paint film properties resulting therefrom.

Table 9

| Ingredients | 1 | 2 | 3 | 4 |
|---|---|---|---|---|
| copolyester [I-4] | 100 | 100 | — | — |
| copolyester [I-5] | — | — | 100 | 100 |
| blocked (polyisocyanate-adduct) | | | | |
| CO-5-1 | 25 | — | — | — |
| CO-5-2 | — | 30 | 40 | — |
| CO-5-3 | — | — | — | 30 |
| TiO₂ (pigment) | 50 | 50 | 50 | 50 |
| benzoin | 0.5 | 0.5 | 0.5 | 0.5 |
| catalyst (Tin comp'd) | 0.3 | 0.3 | 0.3 | 0.3 |
| silicone compound [IIA-5] | 0.8 | 0.8 | 0.8 | 0.8 |
| silicone compound [IIB-2] | 0.8 | 0.8 | 0.8 | 0.8 |

Table 10

| Paint film properties | 1 | 2 | 3 | 4 |
|---|---|---|---|---|
| flatness | ◉ | ○ | ◎ | ○ |
| gloss | 97 | 97 | 97 | 97 |
| scratch resistance | ◉ | ○ | ◎ | ○ |
| surface hardness | 2H | 2H | 3H | 3H |
| Erichsen Test | 7 | 7 | 7 | 7 |
| corrosion resistance | ○ | ○ | ◎ | ○ |

Additional test results on the paint film prepared from the composition 2 are shown in the following:

| (i) | Acid resistance | no effect |
|---|---|---|
| (ii) | Alkaline resistance | no effect |
| (iii) | Solvent resistance | H |
| (iv) | Mar resistance | completely erased |
| (v) | Humidity test | 100/100 pass |
| (vi) | Boiling water resistance | no effect |

It should be understood that various modifications may be added to this invention without departing from the spirit thereof or the scope of the claims. These modifications should be construed as being encompassed by this invention.

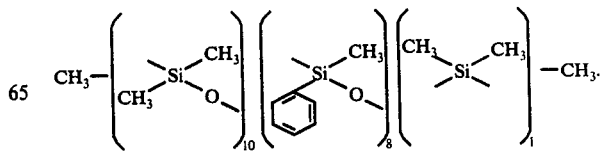

What is claimed is:

1. A heat durable powder coating composition comprising 100 parts by weight of an ethylene-terephthalic acid based copolyester [I] having hydroxy terminals, a coreactant selected from the group consisting of 2 to 10 parts by weight of an alkoxylated polyamine-aldehyde resin; 3 to 15 parts by weight of a polyanhydride; and 10 to 70 parts by weight of a blocked polyisocyanate and 0.1 to 5 parts by weight of silicone compounds [II] which consist of plural members selected from both the group [IIA] and the group [IIB]; the group [IIA] consisting of the silicone compounds conforming to the following formula,

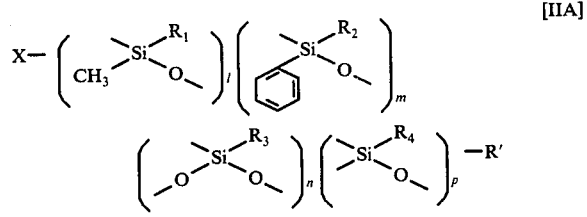

[IIA]

and the group [IIB] consisting of the silicone compounds conforming to the following formula,

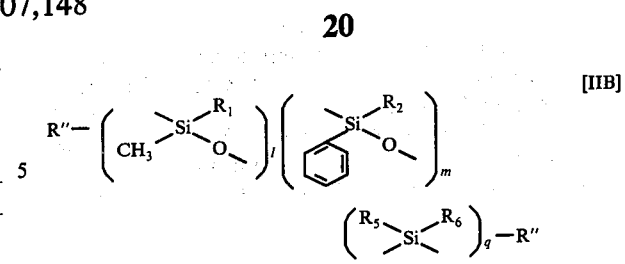

[IIB]

wherein, $R_1$, $R_2$, $R_3$, $R_4$, $R_5$, $R_6$ are methyl or phenyl radicals;

R' is a hydrogen atom or methyl radical and links with the oxygen atom;

R" is methyl or other alkyl radical and links with the Si atom or oxygen atom;

X is methoxy or a hydroxyl radical and links directly with the Si atom;

$l$, $m$, $n$, $p$, $q$ are zero or positive integers, but are not zero all at once in each formula; the mark —O— attached to the Si atom in the formula [IIA] links with any Si atom in the four kinds of organosiloxane units in the formula [IIA], otherwise, terminates with a hydrogen atom or methyl radical;

the bond mark — attached to the Si atom in both formulas [IIA] and [IIB] links with an oxygen atom to form a siloxane bond; and the mark —O— attached to the Si atom in the formula [IIB] links with any Si atom in the three kinds of organosiloxane units in the formula [IIB] or terminates with the R" radical.

2. The heat curable powder coating composition according to claim 1, wherein the ethyleneglycol-terephthalic acid-based copolyester [I] is a copolyester in which the terephthalic acid residue comprises at least 50% mole in total acidic component and the ethyleneglycol residue comprises at least 50% mole in total alcoholic component in the polymer.

3. The heat curable powder coating composition of claim 1, wherein the acidic component of said copolyester [1] other than said terephthalic acid is at least one member selected from the group consisting of isophthalic acid, orthophthalic acid, adipic acid, azelaic acid, sebacic acid, dodecanedicarboxylic acid, citric acid, 1,4-cycloheane dicarboxylic acid, trimellitic acid anhydride, pyromellitic acid dianhydride, p-oxy benzene carboxylic acid, fumaric acid, maleic acid anhydride and oxyethoxy benzoic acid methyl ester, and the alcoholic component of said copolyester [1] other than said ethylene glycol is at least one member selected from the group consisting of propylene glycol, 1,4-butane diol, diethylene glycol, neopentyl glycol, hexamethylene glycol, 2,2-bis[4-(2-hydroxyethoxy)phenyl] propane, cyclohexane dimethanol, glycerol, trimethlol propane and pentaerithyritol.

4. The heat curable powder coating composition of claim 1, wherein said copolyester [1] has a molecular weight in a range of from 1000 to 7000, and a secondary transition temperature in a range of 30° to 80° C measured by the differential scanning calorimetric method.

5. The heat curable powder coating composition of claim 1, wherein said coreactant is a blocked polyisocyanate.

6. The heat curable powder coating composition of claim 1, wherein said coreactant is a blocked polyisocyanate in an amount of 10 to 70 parts by weight on the basis of 100 parts of popolyester [1].

7. The heat curable powder coating composition of claim 1, wherein the radical unit based relative ratio of methyl and phenyl radicals being directly combined with the Si atom of said silicone compound in the group [IIA] is in a range from 0.10 to 0.75.

8. The heat curable powder coating composition of claim 1, wherein said silicone compound of the group [IIA] has a molecular weight of from 400 to 5000.

9. The heat curable powder coating composition of claim 1, wherein said silicone compound of the group [IIA] is a branched silicone compound and, in its general formula, l, m and/or n are positive integers and p is zero.

10. The heat curable powder coating composition of claim 1, wherein said silicone compound of the group [IIA] is a cyclic silicone compound and, in its general formula, n and p are positive integers.

11. The heat curable powder coating composition of claim 1, wherein said silicone compound in the group [IIB] has a methyl ratio of 0.40 to 0.90.

12. The heat curable powder coating composition of claim 1, wherein said silicone compound of the group [IIB] has a molecular weight of from 500 to 10000.

13. The heat curable powder coating composition of claim 1, wherein the amount of said silicone compounds [IIA] and [IIB] to be mixed with said copolyester [I] is from 0.1 to 5 parts by weight on the basis of 100 parts of copolyester.

14. The heat curable powder coating composition of claim 1, wherein the relative ratio of said silicone compounds [IIA] and [IIB] on a weight basis is between 0.1 and 10.

15. The heat curable powder coating composition of claim 1, wherein said silicone compound [IIA] is

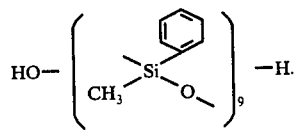

16. The heat curable powder coating composition of claim 1, wherein said silicone compound [IIA] is

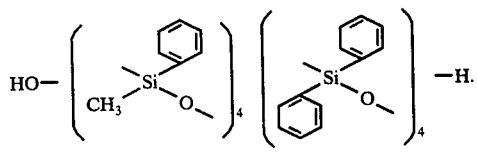

17. The heat curable powder coating composition of claim 1, wherein said silicone compound [IIA] is

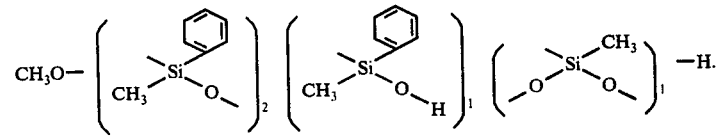

18. The heat curable powder coating composition of claim 1, wherein said silicone compound [IIA] is

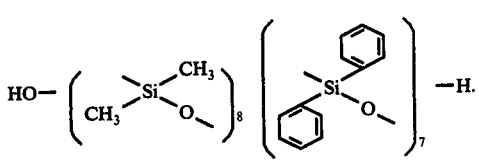

19. The heat curable powder coating composition of claim 1, wherein sadi silicone compound [IIA] is

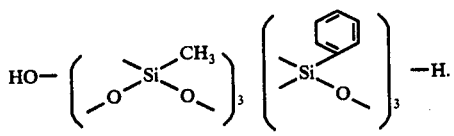

20. The heat curable powder coating composition of claim 1, wherein said silicone compound [IIA] is

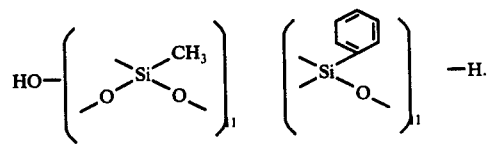

21. The heat curable powder coating composition of claim 1, wherein said silicone compound [IIB] is

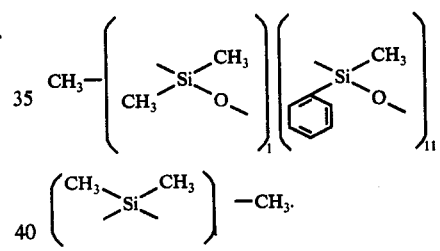

22. The heat curable powder coating composition of claim 1, wherein said silicone compound [IIB] is

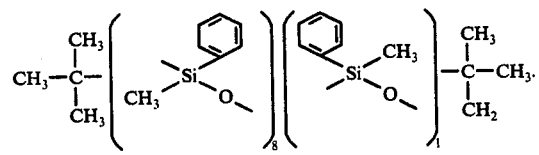

23. The heat curable powder coating composition of claim 1, wherein said silicone compound [IIB] is